(No Model.) 2 Sheets—Sheet 1.

D. M. MACPHERSON.
MILK PURIFIER.

No. 405,367. Patented June 18, 1889.

Witnesses:
John Griet
Wm L Magee

Inventor:
David M. Macpherson
By Henry Griot
Attorney.

(No Model.) 2 Sheets—Sheet 2.

D. M. MACPHERSON.
MILK PURIFIER.

No. 405,367. Patented June 18, 1889.

Witnesses:
John Grist
Wm L Magee

Inventor:
David M. Macpherson
By Henry Grist
Attorney.

UNITED STATES PATENT OFFICE.

DAVID M. MACPHERSON, OF LANCASTER, ONTARIO, CANADA.

MILK-PURIFIER.

SPECIFICATION forming part of Letters Patent No. 405,367, dated June 18, 1889.

Application filed February 4, 1889. Serial No. 298,649. (No model.)

*To all whom it may concern:*

Be it known that I, DAVID M. MACPHERSON, of Lancaster, in the Province of Ontario, in the Dominion of Canada, have made certain new and useful Improvements in Milk-Purifiers; and I do hereby declare that the following is a full, clear, and exact description of the same, reference being had to the accompanying drawings, in which—

Figure 1:
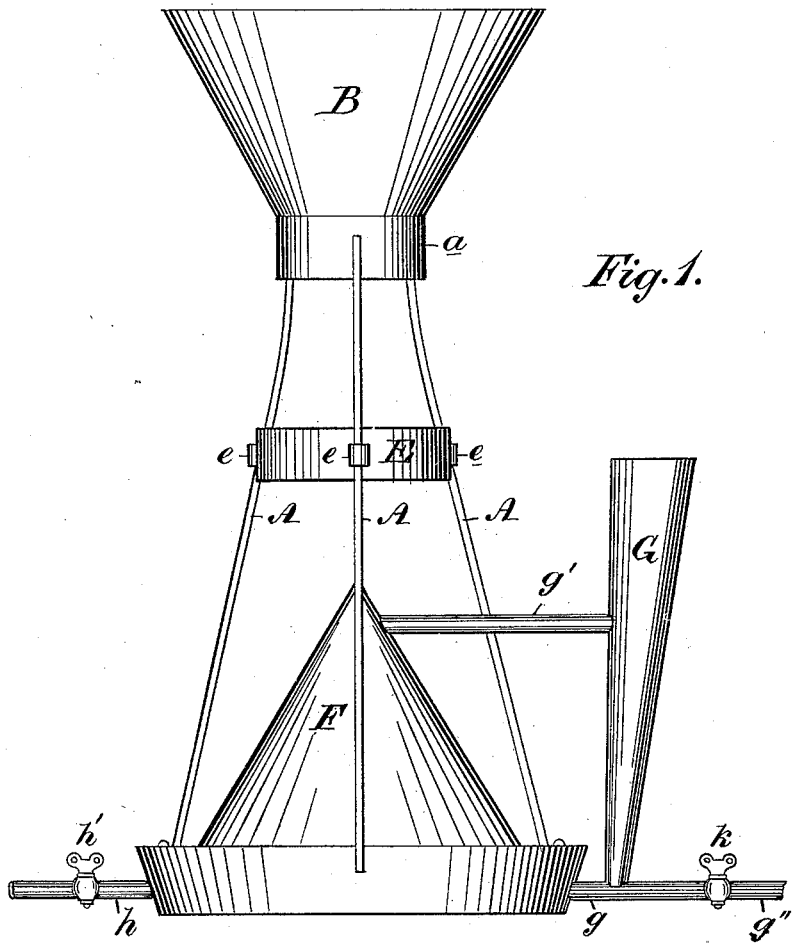
Figure 2:
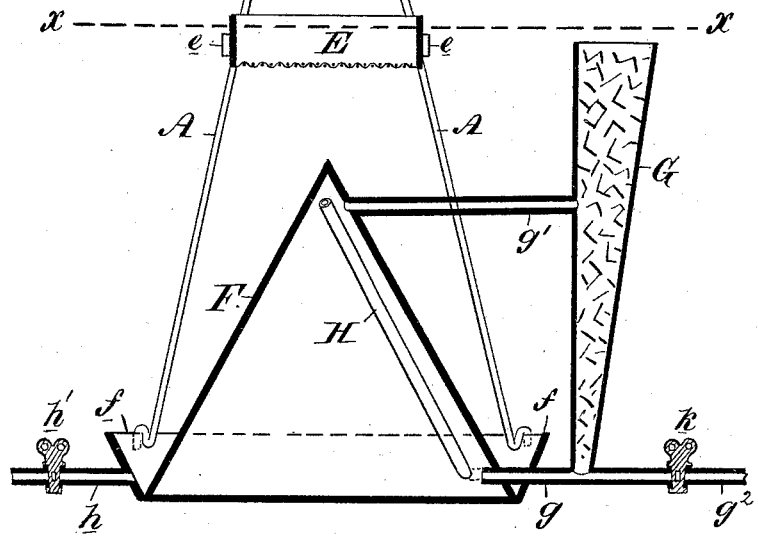
Figure 3:
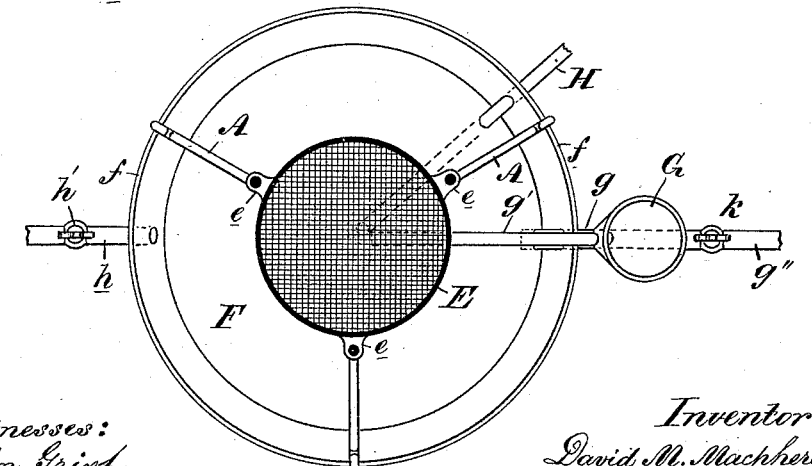

Figure 1 is an elevation of my milk-purifying apparatus. Fig. 2 is a vertical section of the same, and Fig. 3 is a section on line X X, Fig. 2.

My invention has for its object to construct an apparatus for the purification of milk, which purification consists in straining, deodorizing, and cooling the milk at one operation; and my invention consists in the construction and combination of parts composing the apparatus, as will be hereinafter described, and pointed out in the claims.

A represents a tripod-stand supporting a funnel-shaped milk-receiver B, having a neck $a$, and C is a perforated cover at the outlet of said neck for distributing the milk.

D is a strainer, which fits into the neck of the receiver from the inside, and is provided with a handle $d$ for convenience of removal.

E is a sieve, having tubular projections $e$ at the side, which projections slide on the legs of the tripod and support the sieve adjustably, the legs springing sufficiently to allow of a higher or a lower adjustment, and said sieve redistributes the milk falling through it from the perforated cover C.

F is a cone-shaped cooler, closed tight at the bottom and having around the base externally an upturned rim $f$, on which the tripod stands, the feet being bent to an S or other suitable form to take a firm hold of the rim; but, if desired, the tripod may stand on a support outside the rim. The cooler stands on the floor or on a bench when the apparatus is in position for operation.

The milk poured into the receiver B falls in thin streams from the perforated cover C onto the sieve E, and passing through the sieve is thereby redistributed in fine streams and falls upon the cone to remove obnoxious gases and divest the milk of animal heat by contact with the atmosphere and surface of the cone-cooler, and also by exposure while being retained by the rim around the base.

G is a receptacle to contain ice, cold water, or other cooling medium, and said receptacle connects with the cone cooler, near its base, by a pipe $g$, and near the apex by a pipe $g'$. The water supplied to the receptacle G enters the cooler through pipe $g$, and when heated from cooling the milk it rises to the top of the cone and returns to the receptacle G, through the pipe $g'$. The circulation of cold water in the cone keeps the surface at a low temperature.

H is an overflow-pipe within the cone, and extends from near the apex to the base and thence out through the rim $f$. The cone cooler is exhausted of water by a pipe $g''$, which connects with pipe $g$, and said pipe $g''$ is provided with a faucet $k$.

$h$ is a pipe connected to the rim $f$ of the cone to draw off the cooled and deodorized milk by the faucet $h'$.

I claim as my invention—

1. The combination of the cone-shaped cooler F, provided with a rim $f$ and overflow-pipe H, the tripod-stand A, carrying a milk-receiver B, provided with a strainer D and perforated outlet C, the wire sieve E, adjustably attached to the legs of stand A, and the receptacle G, having pipes $g$ $g'$, for inlet and outlet of water to the cooler.

2. The combination, with the stand A, having flexible legs supporting a milk-receiver B, of the wire sieve E, having projections $e$ adjustably engaging the legs of said stand, substantially as set forth.

DAVID M. MACPHERSON.

Witnesses:
DUNCAN FRASER,
JOHN A. McLEAN.